(12) United States Patent
Levy et al.

(10) Patent No.: US 6,349,950 B1
(45) Date of Patent: Feb. 26, 2002

(54) SNOW SLED

(75) Inventors: David E. Levy, Seattle; Paul Kevin Smith, Kirkland, both of WA (US)

(73) Assignee: SledWorks, Inc., Seattle, WA (US)

( * ) Notice: Subject to any disclaimer, the term of this patent is extended or adjusted under 35 U.S.C. 154(b) by 0 days.

(21) Appl. No.: 09/489,521

(22) Filed: Jan. 19, 2000

(51) Int. Cl.⁷ .............................................. B62B 9/04
(52) U.S. Cl. ........................................ 280/22; 280/28
(58) Field of Search ......................... 280/16, 21.1, 22, 280/22.1, 28, 26, 18, 18.1, 87.021, 87.03

(56) References Cited

U.S. PATENT DOCUMENTS

| | | |
|---|---|---|
| 381,665 A | 4/1888 | Allen |
| 1,303,388 A | 5/1919 | Reach |
| 1,909,062 A | 5/1933 | Maneval |
| 2,219,905 A | 10/1940 | Prickman |
| 2,357,928 A | 9/1944 | Bowen et al. |
| 2,446,452 A | 8/1948 | Benson |
| 3,370,862 A | 2/1968 | Huffnagle |
| 3,519,284 A | 7/1970 | Toki |
| 4,077,638 A | 3/1978 | Lund |
| D250,403 S | 11/1978 | Ross |
| 4,161,324 A | 7/1979 | Colvin |
| 4,225,145 A * | 9/1980 | Carr ........................... 280/7.14 |
| 4,334,691 A | 6/1982 | Scheib |
| 4,413,832 A * | 11/1983 | Pendleton ..................... 280/18 |
| 4,418,928 A * | 12/1983 | Cox ......................... 280/11.14 |
| 4,524,984 A | 6/1985 | Axelson |
| 4,530,509 A | 7/1985 | Maxwell, Jr. |
| 4,542,908 A | 9/1985 | Muyskens |
| 4,609,201 A | 9/1986 | Flachsmann |
| 4,666,171 A | 5/1987 | Sellers |
| 4,775,161 A | 10/1988 | Bridges |
| 5,046,750 A * | 9/1991 | Heubl .................... 280/87.021 |
| 5,433,458 A | 7/1995 | Kampe |
| 5,573,257 A | 11/1996 | Olivieri |
| 5,667,229 A * | 9/1997 | Wenger ........................ 280/22 |
| 5,700,020 A | 12/1997 | Noble |

FOREIGN PATENT DOCUMENTS

DE            3644847 A  *  3/1987 ................... 280/22

* cited by examiner

Primary Examiner—Brian L. Johnson
Assistant Examiner—G B. Klebe
(74) Attorney, Agent, or Firm—Christensen O'Connor Johnson Kindness PLLC (57) ABSTRACT

A sled (24) traversing a surface is provided. The sled includes a shell (22) having an upper surface, a lower surface, and spaced first and second ends. The sled also includes a steering assembly (24) coupled to at least the shell, elongate first and second runners (26a) and (26b), and a pivot assembly (60) extending between the shell and at least one of the first and second runners. The pivot assembly permits pivoting motion of the first or second runner relative to the shell. The sled also includes a first attachment assembly (58a–58c) extending between the shell and at least one of the first and second runners, such that the first attachment assembly permits sliding and pivoting motion of the first and second runners relative to the shell.

17 Claims, 5 Drawing Sheets

SNOW SLED

FIELD OF THE INVENTION

The present invention relates generally to recreational equipment and, more particularly, to steerable snow sleds.

BACKGROUND OF THE INVENTION

Recreational snow sledding has been popular for over 100 years. Traditional snow sled includes a substantially planar body having a pair of runners mounted to the lower surface of the body. A steering mechanism may be attached to the body and the forward end of the runners to maneuver the sled as a sledder accelerates down the slope of a snow field. Such sleds turn when the pair of runners in contact with the snow are flexed to form a pair of concentric arcs. The runners carve through the snow, forcing the sled to turn. The sled will turn as long as the runners continue to be flexed into an arc. The more closely the flexed runners approximate a true circular are, the more effective the sledder's steering effort, the less drag is applied to the sled, the better it turns.

Currently, there are two types of steerable runner sleds. The first type of runner sled includes segmented movable runners. A second class of runner sleds includes a one-piece runner. Sleds that includes a segmented movable runner usually includes a two-piece runner that includes a movable steering section and a fixed section. The sled turns by plowing through snow, creating a force vector that pushes the front of the sled to the desired side and skidding the fixed section of the runner. This creates a substantial drag, thereby slowing the sled. Such a sled also starts the rear of the sled skidding, such that it reduces the accuracy and consistency of steering.

Prior sleds with flexible one-piece runners have used support structures that allow for only limited rotation and movement of the runner at the attachment points. As a result, the runners do not flex into a true arc, thus reducing steering effectiveness and creating drag. Another disadvantage of this type of runner connection is that the need for flexible runner attachment points limits the structural strength of these connections. Further, the body of such sleds do not resist the sledder from sliding off during use. Finally, current sleds do not have a safe and effective way to slow or stop the sled.

As a result, there exists a need for a snow sled that includes an efficient steering design without increasing the drag of the sled.

SUMMARY OF THE INVENTION

In accordance with the present invention, a sled for controlled descent of a surface is provided. The sled includes a shell having an upper surface, a lower surface, and spaced first and second ends, and a steering assembly coupled to at least the shell. The sled also includes elongate first and second runners, a pivot assembly and a first attachment assembly. The pivot assembly extends between the shell and at least one of the first and second runners. The pivot assembly permits pivoting motion of the first or second runner relative to the shell. The first attachment assembly extends between the shell and at least one of the first and second runners. The first attachment assembly permits sliding and pivoting motion of the first and second runners relative to the shell.

In accordance with other aspects of this invention, the steering assembly has a first end pivotably attached to the first end of the shell and a second end fastened to each of the first and second runners, such that, in response to a load applied to the steering assembly, the steering assembly causes the runners to slide and pivot within the first attachment assembly and pivot within the pivot assembly.

In accordance with additional aspects of this invention, the sled further includes second and third attachment assemblies extending between the shell and the first and second runners. The second and third attachment assemblies permit sliding and pivoting motion of the runners relative to the shell. In one embodiment, the attachment assemblies permit the runners to bend into an arc, thereby permitting sliding and pivoting motion of the runners relative to the shell.

In accordance with still yet other aspects of this invention, the steering assembly is adjustable along a longitudinal axis extending between the first and second ends of the shell. In one embodiment of the invention, the steering assembly includes a steering yoke and a steering bar, wherein one end of the steering yoke is pivotably attached to the shell and the other end is rotatably attached to the steering bar. The steering bar has a portion fastened to both the runners, such that, in response to a load applied to the steering assembly, the steering assembly causes the runners to translate and pivot within the first attachment assembly and pivot within the pivot assembly.

In accordance with another aspect of this invention, the shell includes a raised portion sized and configured to capture the body movement of a sledder to assist in restraining the sledder within the sled and to assist in steering the sled. The steering assembly includes integrally formed arm supports each being sized and configured to receive the arms of a sledder to assist in restraining the sledder within the sled and to assist in steering of the sled.

In still yet another aspect of this invention, the first and second runners have a shape that mates with the first attachment assembly or pivot assembly, permitting longitudinal motion. In one embodiment, the runners are substantially "I" shaped in cross-section, wherein the lower surface of the runners is arcuate to reduce friction between the lower surfaces of the runners and the surface being traversed by the sled.

In accordance with an additional aspect of this invention, the sled includes a first brake sized and configured to be selectively fastened to the sledder, wherein the first brake is adapted to be displaced into the surface to stop the sled from traversing the surface.

A sled formed in accordance with the present invention has several advantages over sleds used in the past. First, the pivot and slide attachment joints permit the runners to rotate in a horizontal plane and to translate longitudinally, thereby permitting the runners to flex into a true circular arc. This results in a more efficient steering assembly. Further, the integrally formed raised portion in the shell of the sled captures the momentum of the sledder during use to not only assist in restraining the sledder within the sled, but also to use the momentum of the sledder to assist in steering the sled. Finally, an assembly with integrally formed arm supports also assists in restraining the sledder within the sled during use, as well as capturing the momentum of the sledder to further enhance the maneuverability of the sled. Thus, a sled formed in accordance with the present invention is more maneuverable, controllable, and stoppable.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
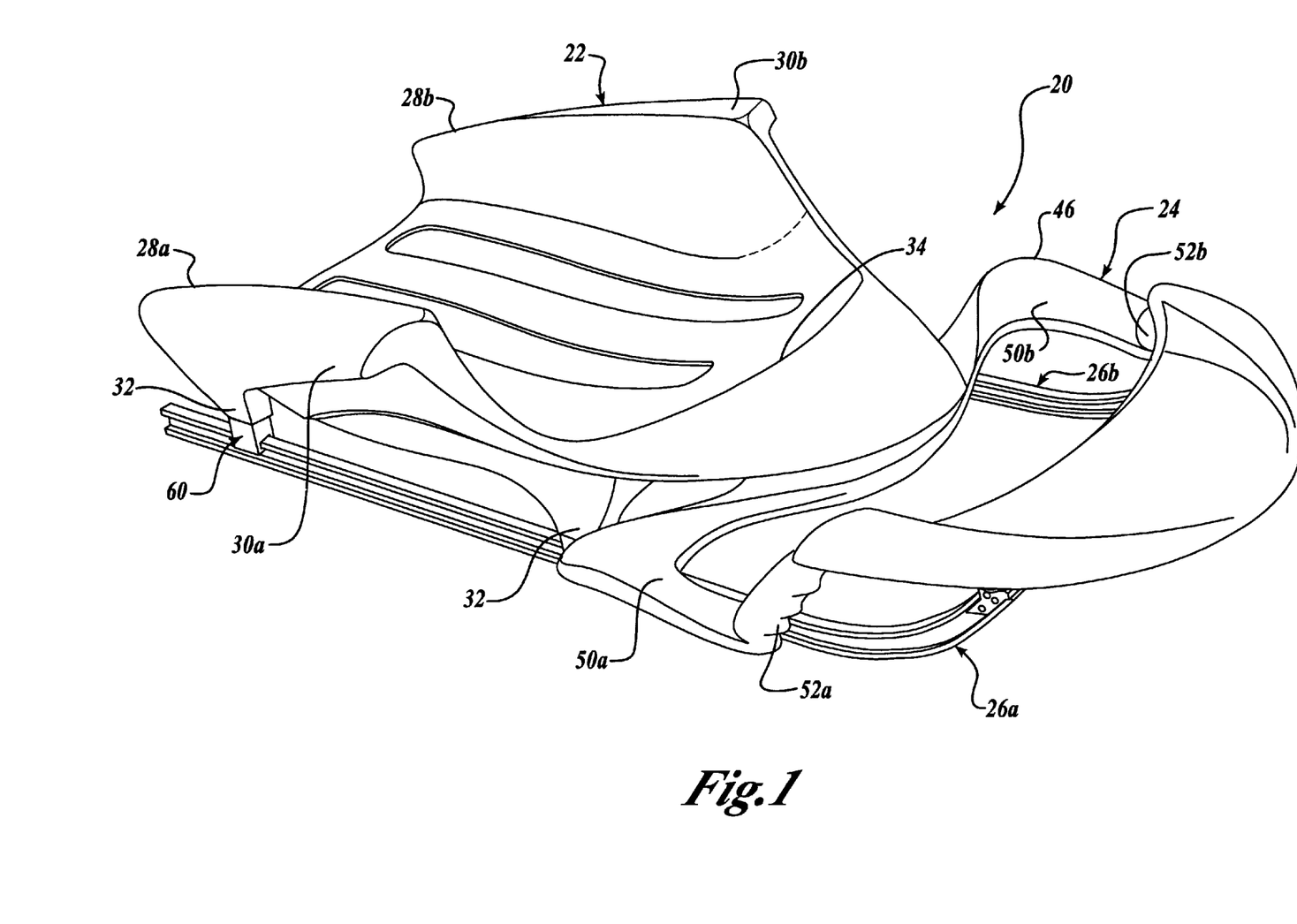
FIG. 1 is a perspective view of a snow sled formed in accordance with the present invention.
Figure 2:
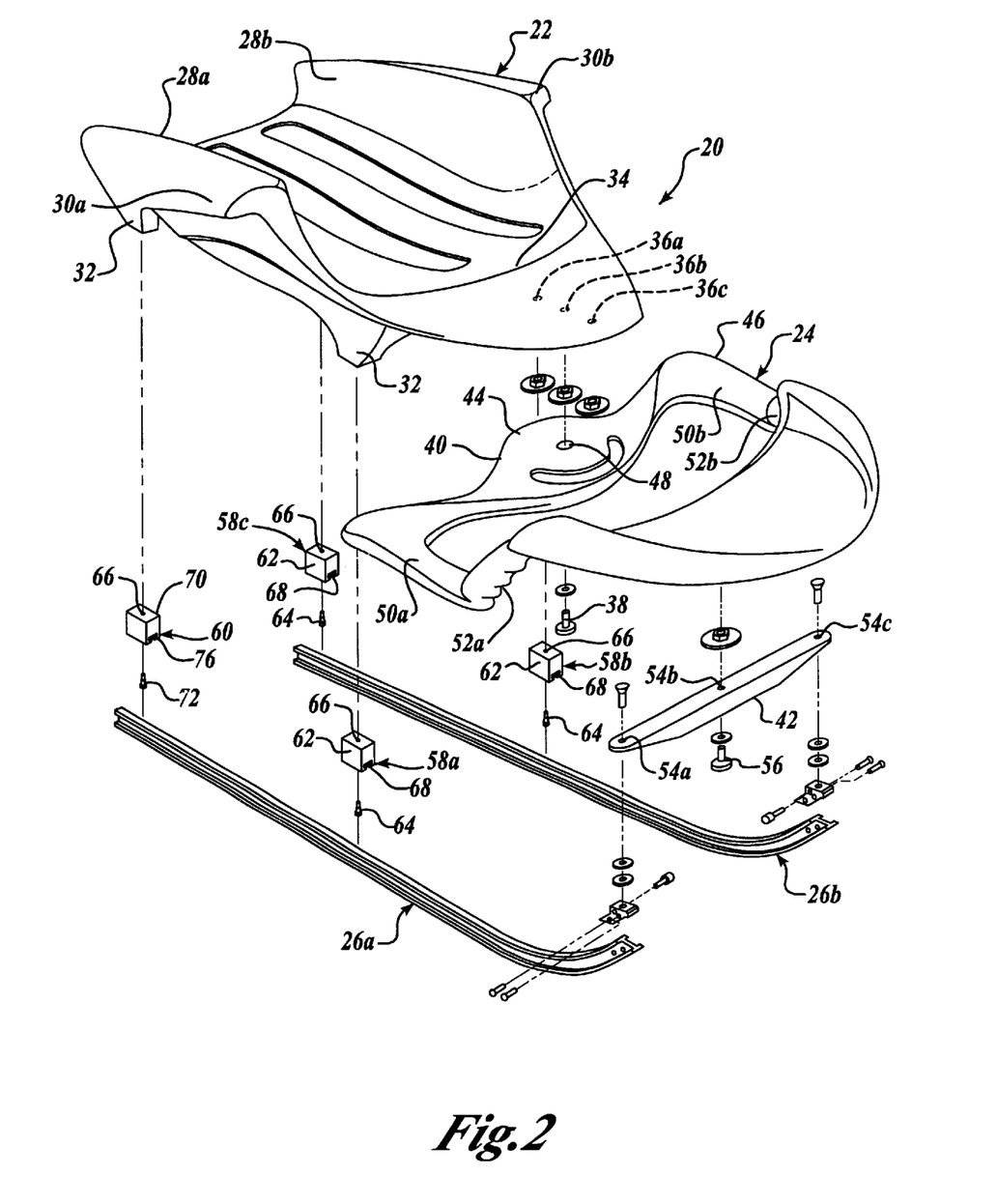
FIG. 2 is an exploded view of a snow sled formed in accordance with the present invention showing the major components of the snow sled.

FIGS. 1 and 2 illustrate a preferred embodiment of a snow sled 20 constructed in accordance with the present invention. The snow sled 20 includes a body shell 22, a steering assembly 24, and first and second runners 26a and 26b. The body shell 22 is an elongate member suitably molded from a thermal plastic, such as a low-density polyethylene, and includes integrally formed sidewalls 28a and 28b. The sidewalls 28a and 28b extend upwardly from the body shell 22, and the upper end of each sidewall 28a and 28b extends outwardly in opposed manner to form first and second hand grips 30a and 30b. Although the snow sled is illustrated with two runners, it should be apparent that a snow sled with fewer or greater number of runners, such as a snow sled with one or three runners, is also within the scope of the present invention.

Extending downward from the lower surface of the body shell 22 are two sets of leg extensions 32. For ease of illustration and clarity, only the first set of leg extensions 32 are illustrated. However, it should be apparent that a second set of leg extensions, configured identically to the first set, extend downwardly from the other side of the body shell 22. Thus, leg extensions 32 are integrally formed on both the left and right sides of the lower surface of the body shell 22 and extend downwardly from both the forward and rearward end of the body shell 22. Suitably, a leg extension is integrally formed with each corner of the lower surface of the body shell 22. Although an integrally formed leg extension is preferred, other configurations, such as separately formed leg extensions fastened to the body shell, are also within the scope of the present invention. Additionally, although a body shell with four leg extensions is preferred, such a shell with more or fewer leg extensions, such as a body shell with six leg extensions or a body shell with three leg extensions, is also within the scope of the present invention.

Still referring to FIGS. 1 and 2, the body shell 22 includes a body support 34. In one embodiment of the present invention, the forward, or leading, end of the body shell 22 is sloped upwardly to form the body support 34. The body support 34 is sized and configured to elevate a portion of a sledder's body, such as the chest, during use, as is described in greater detail below. It also prevents the sledder from sliding forward.

The lower surface of the forward end of the body shell 22 includes a plurality of adjustment bores 36a–36c (shown in phantom) extending partially through the vertical direction of the body shell 22. Each adjustment bore 36a–36c is suitably an internally threaded bore sized to receive an externally threaded fastener 38, such as a screw. The adjustment bores 36a–36c are suitably aligned along a longitudinal axis extending between the forward and rearward ends of the body shell 22. The adjustment bores 36a–36c are adapted to rotatably attach the steering assembly 24 to the body shell 22. Further, the plurality of adjustment bores 36a–36c permit the steering assembly 24 to be adjusted in the longitudinal direction relative to the body shell 22 to accommodate sledders of varying sizes.

The steering assembly 24 includes a steering yoke 40 and a steering bar 42. The steering yoke 40 is suitably molded from a thermal plastic, such as a low-density polyethylene. The steering yoke 40 includes an attachment portion 44 and an arm support 46. The attachment portion 44 is centrally located in the rearward end of the steering yoke 40 and includes an attachment bore 48 extending vertically through the attachment portion 44. The attachment bore 48 is located on the attachment portion 44 for vertical alignment with the adjustment bores 36a–36c. The steering yoke 40 is rotatably attached to the body shell 22 by the fastener 38 extending through the attachment bore 44 and into one of the adjustment bores 36a–36c. Depending on which one of the adjustment bores 36a–36c the steering yoke 40 is attached to, the sledder may adjust the steering yoke 40 along a longitudinal axis extending between the forward and rearward end of the body shell 22 to increase or decrease the longitudinal distance between the arm support 46 and the body support 34.

The arm support 46 is integrally formed with the attachment portion 44 and extends forwardly from each side of the attachment portion 44. The arm support 46 includes first and second forearm supports 50a and 50b and first and second hand grips 52a and 52b. The forearm supports 50a and 50b and the hand grips 52a and 52b are sized to receive the forearms of a sledder during use, such that a sledder may nest his arms within the arm support 46. As configured, the arm support 46 is configured to capture movement of a sledder during use to assist in restraining the sledder within the snow sled 20, as well as assist in steering the snow sled 20, as is described in greater detail below.

The steering bar 42 is suitably formed from a high-strength material, such as aluminum, and is substantially rectangular in configuration. The steering bar 42 includes a plurality of attachment bores 54a–54c extending vertically through the attachment bar 42. Two of the attachment bores 54a and 54c are located at opposite ends of the steering bar 42, while the third attachment bore 54b is centrally located between the ends of the attachment bar 42. The attachment bore 54b is configured to rotatably attach the attachment bar 42 to the forward end of the steering assembly 24 by a well known fastener 56, such as an externally threaded bolt. The fastener 56 is sized to be threadably received within an internally threaded bore (not shown) extending partially through the vertical direction of the steering assembly 24.

Referring now to FIGS. 2–5, attachment of the body shell 22 to the runners 26a and 26b, will now be described in greater detail. As seen best in FIG. 2, the body shell 22 is coupled to the first and second runners 26a and 26b by a plurality of pivot and slide attachment joints 58a–58c and a pivot attachment joint 60. Each of the plurality of pivot and slide attachments are sometimes referred to as an attachment assembly. The pivot attachment point 60 is sometimes referred to herein as a pivot assembly. The pivot and slide attachment joints 58a–58c are identically configured and, therefore, only one pivot and slide attachment joint will be described in greater detail. However, it should be apparent that the description of one pivot and slide attachment joint is applicable to the other joints. The pivot and slide attachment joint 58a includes a pivot block 62 and a pivot bolt 64. The pivot block 62 is suitably formed from a rigid plastic and is substantially rectangular in configuration. The pivot block 62 includes a bore 66 extending vertically therethrough. The lower surface of the pivot block 62 includes a shaped slide channel 68 extending longitudinally through the attachment block 62. The slide channel 68 is adapted to be slideably received on the runners 62a and 62b to slidingly attach the runners 26a and 26b to the body shell 22, as is described in greater detail below.

Each of the pivot and slide attachment joints 58a58c is fastened to the leg extensions 32 of the body shell 22 by the pivot bolt 64 extending vertically through the bore 66 and into a corresponding bore (not shown) located in each of the leg extensions 32. As attached, the pivot block 62 is permitted to pivot about the pivot bolt 64 during use, as is also described in greater detail below.

Figure 3:
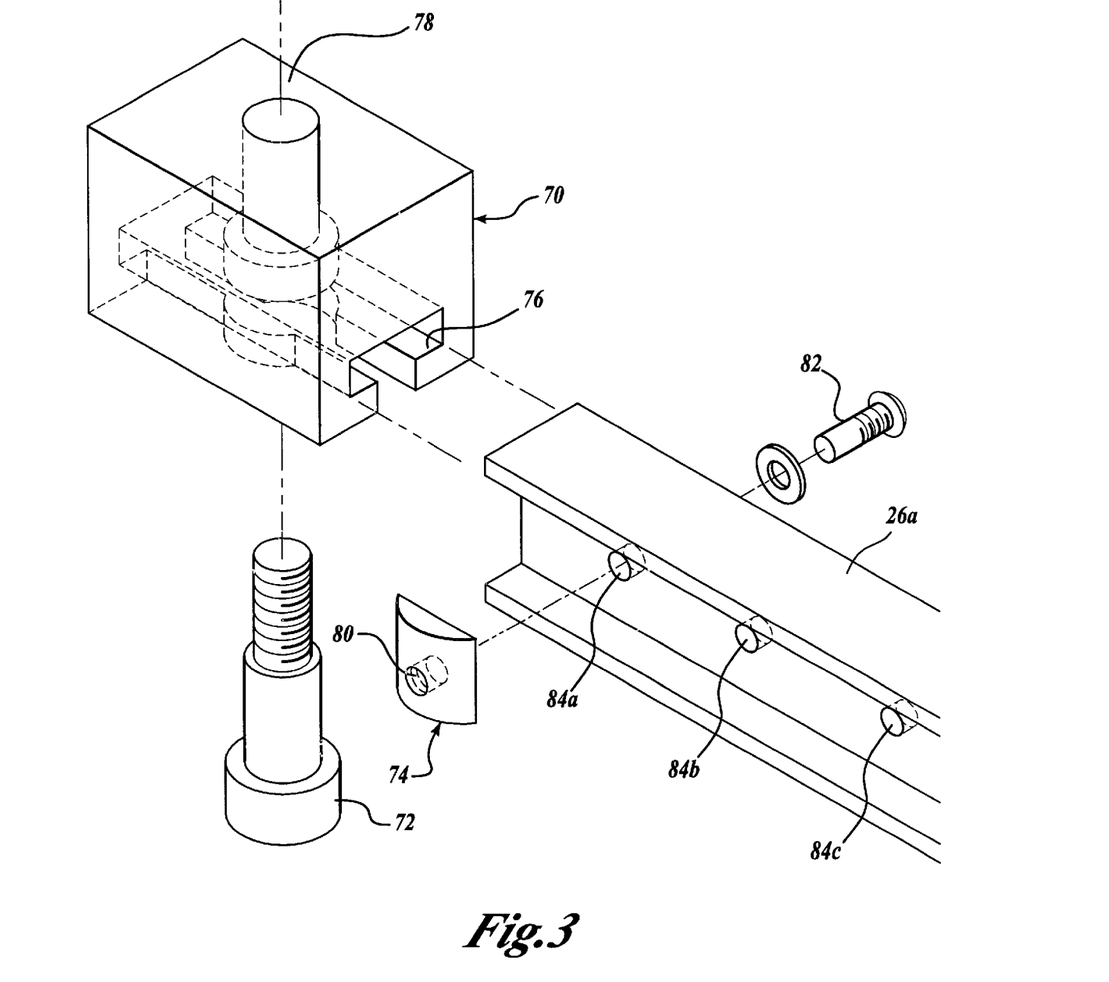
FIG. 3 is an exploded partial view of a pivot attachment assembly for a snow sled formed in accordance with the present invention.
Figure 4:
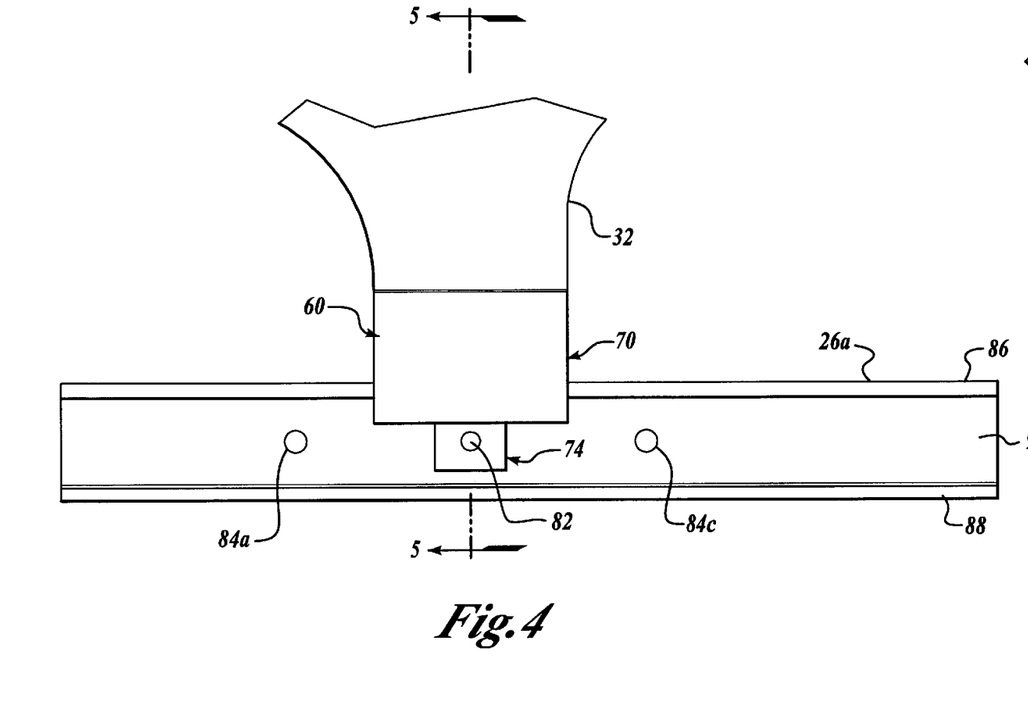
FIG. 4 is a side view of a pivot assembly attached to a rail of a sled formed in accordance with the present invention.
Figure 5:
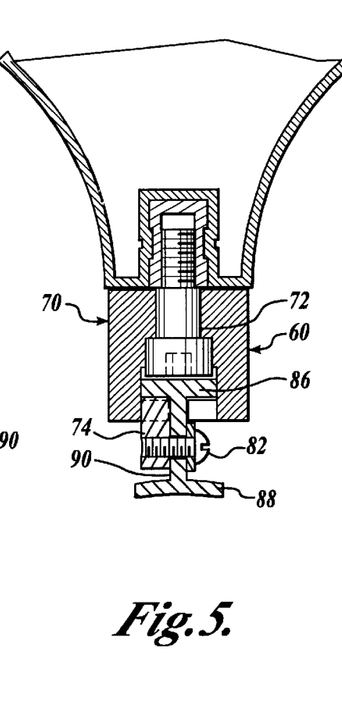
FIG. 5 is a cross-sectional end view of a pivot attachment assembly for a sled formed in accordance with the present invention.

Referring now to FIGS. 3–5, the pivot attachment joint 60 will now be described in greater detail. The pivot attachment joint 60 includes a pivot block 70, a pivot bolt 72, and a stop block 74. The pivot block 70 and pivot bolt 72 are identically configured to the pivot block 62 and pivot bolt 64, described, above, for the pivot and slide attachment joint 58. As seen best in FIG. 3, the pivot block 70 includes a shaped slide channel 76 extending longitudinally through the lower surface of the pivot block 70. Also, the pivot block 70 includes a vertically extending bore 78 sized to receive the pivot bolt 72 therein.

The stop block 74 is suitably formed from a high-strength material, such as aluminum, and is sized to be partially received within the lower end of the bore 78 extending through the pivot block 70. The stop block 74 also includes an attachment bore 80 extending laterally therethrough. The attachment bore 80 is located on the stop block 74 such that it corresponds with one of a plurality of bores 84a–84c located in the rearward end of the runners 26a. As assembled, the pivot bolt 72 extends vertically through the bore 78 and into the leg extension 32 of the body shell 22. As attached, the pivot block 70 is capable of pivoting about the pivot bolt 72.

The stop block 74 is partially slideably received within the lower end of the bore 78, such that the attachment bore 80 may be accessed from the outboard side of the pivot attachment joint 60. The pivot attachment joint 60 is then slideably received on the runner 26a. The stop block 74 is then aligned with one of the plurality of bores 84a–84c and the fastener 82 extends through the attachment bore 80 and into one of the bores 84a–84c to position and fix the translational movement of the pivot attachment joint 60. Although a single stop block 74 is illustrated as fastening the pivot attachment joint 60 to the runner 26a, a second stop block 74 may be located on the opposite side of the runner 26a, such that the fastener 82 extends through both stop blocks, as well as the runner 26a. Further, although it is preferred that the pivot attachment joint 60 be located at one of the rear leg extensions 32, it should be apparent that other locations of the pivot attachment joint 60, such as one of the forward leg extensions, are also within the scope of the present invention.

Referring to FIGS. 4 and 5, the runners 26a and 26b, will now be described in greater detail. Each runner 26a and 26b is identically configured and, therefore, only one runner will be described in greater detail. However, it should be apparent that the description of one runner is applicable to the other runner. The runner 26 includes upper and lower flanges 86 and 88 spaced by a web portion 90. The upper flange 86 is shaped and sized to be received within the slide channels 68 of the pivot and slide attachment joint 58, as well as the slide channel 76 of the pivot attachment joint 60. As previously noted, the shape of the upper flange 86 mates with the shape of the corresponding slide channel such that the upper flange 86 is nested within the slide channel. As nested within the slide channel, the runner is permitted to slide in the longitudinal direction of the runner. However, lateral movement of the runner is resisted by interference with the sides of the slide channel. In one embodiment, the slide channels 68 and 76 are T-shaped. While the shape of the upper flange and channels 68 and 76 is not important, it is important that the upper flange and channels be shaped to match the other. As a result, numerous configurations of the upper flange and channels, such as circular and oval, are within the scope of the present invention.

As received within the slide channels 68 and 76, the lower flange 88 of each runner extends downwardly therefrom. The lower flange 88 is concave when seen from the end view. The concave, or arcuate, cross-section of the lower flange 88 defines a surface of low frictional contact between the runner 26 and the surface being traversed by the snow sled 20.

Figures 6, 7:
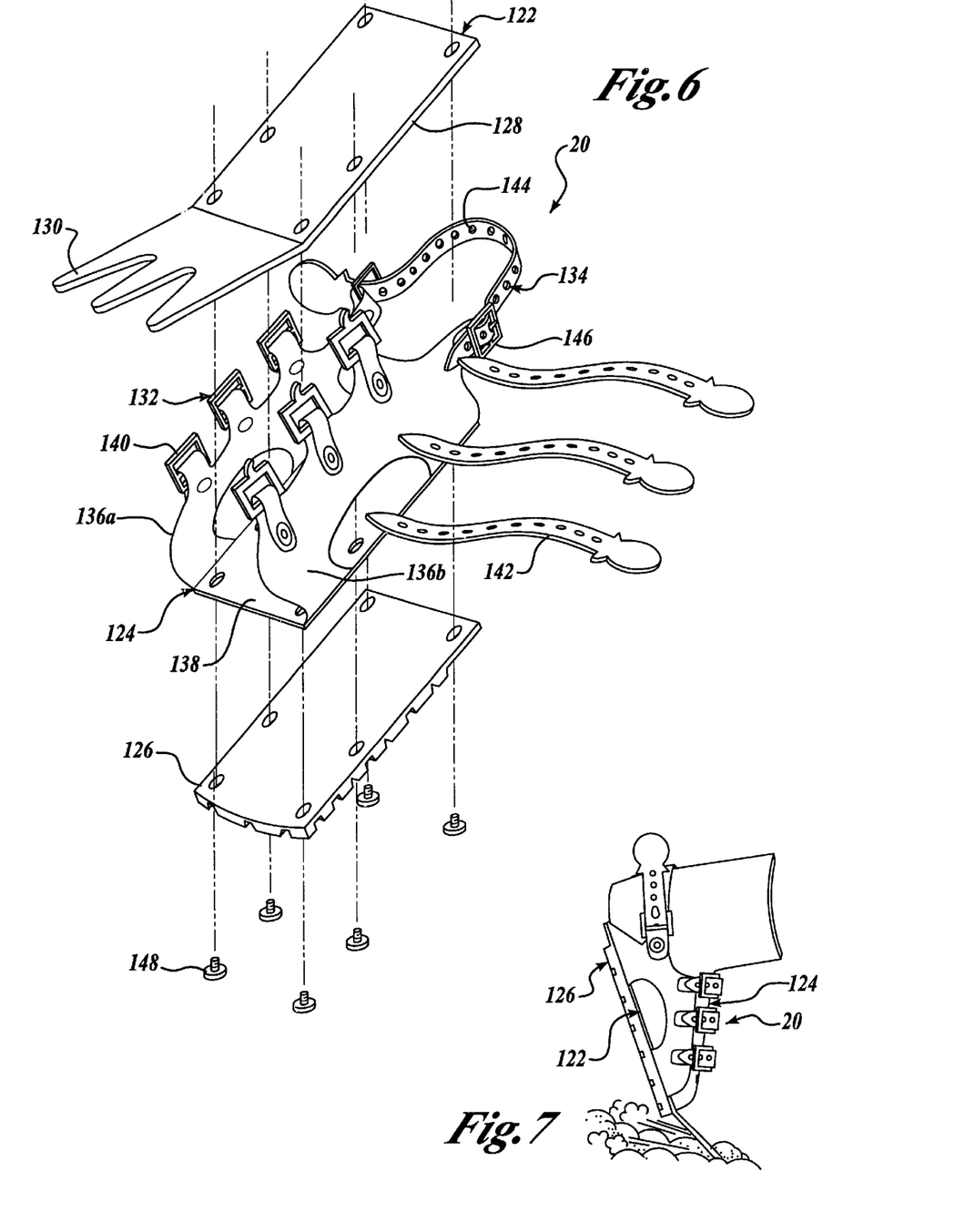
FIG. 6 is an exploded view of a brake for a snow sled formed in accordance with the present invention.
FIG. 7 is an environmental view of a brake for a snow sled formed in accordance with the present invention.

FIGS. 6 and 7 illustrate a preferred embodiment of a brake assembly 120 constructed in accordance with the present invention. The brake assembly 120 includes a brake plate 122, a binding 124 and a tread plate 126. The brake plate 122 is suitably formed from a high strength material, such as aluminum. The brake plate 122 includes a substantially rectangular attachment plate 128 and a serrated portion 130 integrally formed with one end of the attachment plate 128. The brake plate 122 is sized to be nested within the binding 124.

The binding 124 is suitably formed from a polyester reinforced hypalon fabric and includes a shoe retention portion 132 and a heel retention portion 134. The shoe retention portion 132 includes a pair of sidewalls 136a and 136b extending upwardly from a base portion 138. The upper ends of the sidewalls 136a and 136b include a plurality of buckles 140 and straps 142. The straps 142 are sized to be selectively received within the buckles 140.

The heel retention portion 132 includes a strap 144 sized to be received within a buckle 146. The straps 142 and 144 for the shoe retention portion 132 and heel portion potion 134, respectively, include a plurality of holes extending therethrough, such that the straps 142 and 144 may be selectively fastened to their respective buckles 140 and 146 to accommodate different size boots.

The tread plate 126 is sized and configured to be fastened to the lower surface of the base portion 138 of the binding 124 by a plurality of well known fasteners 148, such as screws or rivets. Thus, as assembled, the base portion 138 of the binding 124 is sandwiched between the brake plate 122 and the tread plate 126, and the brake assembly 120 is sized to be selectively attached to a variety of different size boots. Although a single brake assembly 120 is illustrated and described, it should be apparent that a second brake assembly may be selectively attached to the other boot of the sledder. As a result, a snow sled 20 formed in accordance with the present invention may be used with one or two brake assemblies 120. Further, although a brake assembly selectively attachable to one or more boots of the sledder is disclosed, it should be apparent that other configurations, such as a brake plate integrally formed with a boot, are also within the scope of the present invention. In one such alternate embodiment, the brake plate may be formed with the toe end of a boot.

Referring to FIG. 1, operation of the snow sled will now be described in greater detail. A person may lie face down on the body shell 22, such that the person's chest is received against the body support 34. As received, the sledder's chest and, therefore, head is supported and elevated slightly upwards in an incline position as the snow sled 20 traverses down a hill. As configured, the body support 34 assists in restraining the sledder within the body shell 22 during use of the snow sled 20. Also, the body support 34, by being elevated, captures at least a portion of the sledder's momentum or forward movement, thereby assisting in restraining the sledder within the snow sled. Similarly, the sidewalls 28a and 28b capture at least a portion of side to side movement of the sledder to assist in maneuvering the snow sled through turns. As a non-limiting example, to turn the snow sled to the left, the sledder would lean against the second sidewall 30b through the turn. Alternatively, a sledder may sit within the body shell 22 and use the hand grips 30a and 30b to assist in restraining the sledder within the body shell 22 during use.

The snow sled 20 is steered by selectively applying a turning load to one of the hand grips 52a and 52b of the steering assembly 24. As a non-limiting example, the snow sled 20 is steered to the right by grasping the hand grips 52a and 52b of the steering yoke 40 with the sledder's hands and pushing with the left hand while simultaneously pulling with the right hand. The first and second forearm supports capture at least a portion of the forward movement or momentum of the sledder during the turn, thereby enhancing the maneuverability of the snow sled. This action causes the steering bar 42 moves laterally to the right, thereby pushing the front ends of both the first and second runners 26a and 26b to the right. As a result, the runners 26a and 26b are permitted to both translate longitudinally and rotate within each of the pivot and slide attachment joints 58a–58c. The rearward end of the first runner 26a is permitted to pivot about its corresponding leg extension 32 by the pivot attachment joint 60. The pivot and slide attachment joints 58a–58c, and the pivot attachment joint 60, combine to permit the runners 26a and 26b to flex into a true circular arc during use. As the runners 26a and 26b are flexed into an arc, the length of each runner 26a and 26b between pivot and slide attachment joint 58a and pivot attachment joint 60, and between the pivot and slide attachment joints 58b and 58c increases. This increase is allowed for by the runner being able to translate longitudinally through the pivot and slide attachment joints 58a–58c.

Operation of the brake assembly 120 may be best understood by referring to FIG. 7. The brake assembly 120 is adjustably fastened to one or both boots of the sledder by the binding 124. The sledder selectively adjusts the straps 142 and 144 of the shoe retention portion 132 and heel retention portion 134, respectively. As coupled to the boot of a sledder, the serrated portion 130 projects forwardly from the toe end of the boot, and is suitably pitched upward. During use of the snow sled 20, the sledder may either slow the forward progress of the snow sled 20 or completely stop the forward progress of the snow sled 20 by dragging the toe end of the boot down into the snow, such that the serrated portion 130 of the brake assembly 120 drags into the snow, thereby slowing or stopping the forward motion of the snow sled 20.

From the foregoing descriptions, it may be seen that a snow sled formed in accordance with the present invention incorporates many novel features and offers significant advantages over currently available sleds. While the presently preferred embodiments of the intention have been illustrated and described, it is to be understood that within the scope of the appended claims, various changes can be made therein without departing from the spirit and scope of the invention.

The embodiments of the invention in which an exclusive property or privilege is claimed are defined as follows:

1. A sled for traversing a surface, the sled comprising:
   (a) a shell having an upper surface, a lower surface, and spaced first and second ends;
   (b) a steering assembly coupled to at least the shell;
   (c) elongate first and second runners, each runner having an upper surface and a lower surface;
   (d) a pivot assembly extending between the shell and at least one of the first and second runners, the pivot assembly permitting pivoting, but not sliding, motion of the first or second runner relative to the shell; and
   (e) a first attachment assembly extending between the shell and at least one of the first and second runners, the first attachment assembly permitting sliding and pivoting motion of the at least one of the first and second runners relative to the shell.

2. The sled of claim 1, wherein the steering assembly has a first end pivotably attached to the first end of the shell and a second end fastened to each of the first and second runners, such that, in response to a load applied to the steering assembly, the steering assembly causes the first and second runners to slide and pivot within the first attachment assembly and pivot within the pivot assembly.

3. The sled of claim 1, further comprising second and third attachment assemblies, the second and third attachment assemblies extending between the shell and the first and second runners, respectively, the second and third attachment assemblies permitting sliding and pivoting motion of the first and second runners relative to the shell.

4. The sled of claim 3, wherein the steering assembly has a first end pivotably attached to the first end of the shell and a second end fastened to each of the first and second runners, such that, in response to a load applied to the steering assembly, the steering assembly causes the first and second runners to bend into an arc thereby sliding and pivoting within the first, second and third attachment assemblies and pivot within the pivot assembly.

5. The sled of claim 3, wherein the steering assembly has a first end pivotably attached to the first end of the shell and a second end fastened to one of the first and second runners, such that, in response to a load applied to the steering assembly, the steering assembly causes the first and second runners to bend, thereby causing the runners to slide and pivot within the first, second and third attachment assemblies and pivot within the pivot assembly.

6. The sled of claim 5, wherein the steering assembly is adjustable along a longitudinal axis extending between the first and second ends of the shell.

7. The sled of claim 1, wherein the steering assembly comprises a steering yoke and a steering bar, one end of the steering yoke being pivotably attached to the shell and the other end being rotatably attached to the steering bar, wherein the steering bar having a portion fastened to one of the first and second runners, such that, in response to a load applied to the steering assembly, the steering assembly causes the first and second runners to slide and pivot within the first attachment assembly and pivot within the pivot assembly.

8. The sled of claim 7, wherein the steering assembly is adjustably located along a longitudinal axis extending between the first and second ends of the shell.

9. The sled of claim 1, wherein the shell comprises a raised portion adapted to capture momentum of a sledder during use to assist in restraining the sledder within the sled and to assist in steering the sled.

10. The sled of claim 9, wherein the steering assembly includes integrally formed arm supports, each arm support being sized and configured to receive the arms of a sledder during use to assist in restraining the sledder within the sled and to assist in steering of the sled.

11. The sled of claim 1, wherein the steering assembly includes integrally formed arm supports, each arm support being sized and configured to receive the arms of a sledder during use to assist in restraining the sledder within the sled and to assist in steering of the sled.

12. The sled of claim 1, wherein the upper surface of the first and second runners is sized and configured to slidably mate with the pivot assembly and the first attachment assembly.

13. The sled of claim 12, wherein the lower surfaces of the first and second runners are arcuate to reduce friction between the lower surfaces of the first and second runners and the surface being traversed by the sled.

14. A sled for traversing a surface, the sled comprising:
(a) a body shell having an upper surface, a lower surface, and longitudinally spaced first and second ends;
(b) elongate first and second runners, each runner having an upper surface and a lower surface;
(c) a steering assembly having one end coupled to the body shell and a second end coupled to the first and second runners;
(d) a pivot joint extending between the body shell and at least one of the first and second runners, the pivot joint permitting pivoting, but not sliding, motion of the first or second runner relative to the body shell; and
(e) a first pivot and slide joint extending between the body shell and at least one of the first and second runners, the first pivot and slide joint permitting sliding and pivoting motion of the at least one of the first and second runners relative to the body shell.

15. A sled for traversing a surface, the sled comprising:
(a) a body shell having an upper surface, a lower surface, and longitudinally spaced first and second ends, the body shell having an integrally formed body support, the body support being sized and configured to capture momentum of a sledder during use to assist in restraining the sledder within the sled and to assist in steering of the sled;
(b) elongate first and second runners, each runner having an upper surface and a lower surface;
(c) a steering assembly having one end coupled to the body shell and a second end coupled to the first and second runners;
(d) a pivot joint extending between the body shell and at least one of the first and second runners, the pivot joint permitting pivoting, but not sliding, motion of the first or second runner relative to the body shell; and
(e) a first pivot and slide joint extending between the body shell and at least one of the first and second runners, the first pivot and slide joint permitting sliding and pivoting motion of the at least one of the first and second runners relative to the body shell.

16. A sled for traversing a surface, the sled comprising:
(a) a body shell having an upper surface, a lower surface, and longitudinally spaced first and second ends, the body shell having an integrally formed body support, the body support being sized and configured to capture forward and lateral movement of a sledder during use to assist in restraining the sledder within the sled and to assist in steering of the sled;
(b) elongate first and second runners, each runner having an upper surface and a lower surface;
(c) a steering assembly having one end coupled to the body shell and a second end coupled to the first and second runners;
(d) a pivot joint extending between the body shell and at least one of the first and second runners, the pivot joint permitting pivoting, but not sliding, motion of the first or second runner relative to the body shell; and
(e) a first pivot and slide joint extending between the body shell and at least one of the first and second runners, the first pivot and slide joint permitting sliding and pivoting motion of the at least one of the first and second runners relative to the body shell.

17. A sled for traversing a surface, the sled comprising:
(a) a shell having an upper surface and a lower surface;
(b) a steering assembly coupled to the shell;
(c) first and second runners, each runner having an upper surface and a lower surface;
(d) a pivot assembly extending between the shell and the first runner, the pivot assembly permitting pivoting, but not sliding, motion of the first runner;
(e) a first pivot and slide assembly extending between the shell and the first runner, the pivot and slide assembly permitting sliding and pivoting motion of the first runner.

* * * * *